(12) United States Patent
Harkey et al.

(10) Patent No.: US 8,395,779 B2
(45) Date of Patent: Mar. 12, 2013

(54) LASER SURVEILLANCE SYSTEM

(75) Inventors: Deon Austin Harkey, McKinney, TX (US); William Clayton Hester, Jr., Allen, TX (US); William J. Gray, III, Lewisville, TX (US)

(73) Assignee: The Boeing Company, Chicago, IL (US)

( * ) Notice: Subject to any disclaimer, the term of this patent is extended or adjusted under 35 U.S.C. 154(b) by 8 days.

(21) Appl. No.: 13/156,034

(22) Filed: Jun. 8, 2011

(65) Prior Publication Data

US 2012/0314221 A1  Dec. 13, 2012

(51) Int. Cl.
*G01N 21/55* (2006.01)
*G01N 21/00* (2006.01)

(52) U.S. Cl. .................... 356/445; 356/237.3
(58) Field of Classification Search .......... 356/445, 356/601, 237.3
See application file for complete search history.

(56) References Cited

U.S. PATENT DOCUMENTS

| | | | | |
|---|---|---|---|---|
| 2,433,971 A * | 1/1948 | Adams | ............................ | 348/81 |
| 3,674,925 A * | 7/1972 | Heckman, Jr. | ................ | 348/143 |
| 3,757,042 A * | 9/1973 | Funk | ................ | 348/81 |
| 3,765,184 A * | 10/1973 | Menard | ........................ | 405/171 |
| 3,776,574 A * | 12/1973 | Henderson et al. | ........... | 283/117 |
| 3,780,220 A * | 12/1973 | Fugitt et al. | ..................... | 348/81 |
| 3,916,094 A * | 10/1975 | Marrone | .................... | 348/211.4 |
| 4,174,524 A | 11/1979 | Moran | | |
| 4,175,269 A * | 11/1979 | Rebikoff | ......................... | 348/81 |
| 4,707,128 A * | 11/1987 | Coles | ............................ | 356/5.04 |
| 4,713,967 A * | 12/1987 | Overs et al. | ................ | 73/170.33 |
| 5,047,990 A * | 9/1991 | Gafos et al. | ....................... | 367/6 |
| 5,313,261 A * | 5/1994 | Leatham et al. | ............. | 356/5.04 |
| 5,409,537 A * | 4/1995 | Poullos et al. | ................ | 118/669 |
| 5,790,620 A * | 8/1998 | Okazaki et al. | ................ | 376/305 |
| 5,809,099 A * | 9/1998 | Kim et al. | ..................... | 376/249 |
| 6,084,202 A * | 7/2000 | Okazaki et al. | ........... | 219/121.61 |
| 6,317,387 B1 * | 11/2001 | D'Amaddio et al. | ......... | 367/129 |
| 6,571,635 B1 * | 6/2003 | Baltzersen et al. | ............. | 73/625 |
| 6,707,761 B2 * | 3/2004 | Erikson | ........................ | 367/131 |
| 6,854,410 B1 * | 2/2005 | King et al. | .................... | 114/244 |
| 7,044,074 B2 * | 5/2006 | Harrie et al. | .................. | 114/222 |
| 7,296,464 B2 * | 11/2007 | Hostetler | .................. | 73/170.33 |
| 7,301,851 B1 * | 11/2007 | Mixon et al. | .................... | 367/11 |

(Continued)

FOREIGN PATENT DOCUMENTS

EP  1293804 A1  3/2003

OTHER PUBLICATIONS

Extended European Search Report of application No. 12168284.3-2220; Jul. 8, 2012; 7 pages.

(Continued)

*Primary Examiner* — Roy M Punnoose
(74) *Attorney, Agent, or Firm* — Armstrong Teasdale LLP

(57) ABSTRACT

A laser surveillance system includes a housing positioned generally at or below a water line and a laser and detector mechanism positioned within the housing. The mechanism includes a laser source and a sensor. The laser source is configured to project a laser beam towards a vessel being inspected. The sensor is configured to receive a reflection of the laser beam.

20 Claims, 7 Drawing Sheets

U.S. PATENT DOCUMENTS

| | | | |
|---|---|---|---|
| 7,417,923 B2* | 8/2008 | Greelish | 367/129 |
| 8,200,074 B1* | 6/2012 | Melancon | 396/28 |
| 2004/0016384 A1* | 1/2004 | Hux et al. | 114/221 R |
| 2006/0008137 A1* | 1/2006 | Nagahdaripour et al. | 382/154 |
| 2006/0060123 A1* | 3/2006 | Harrie et al. | 114/221 R |
| 2006/0269042 A1* | 11/2006 | Muhanna et al. | 378/57 |
| 2009/0312980 A1* | 12/2009 | Kobayashi et al. | 702/150 |
| 2009/0316145 A1* | 12/2009 | Widera | 356/240.1 |

OTHER PUBLICATIONS

McLean, J. et al; Effects of Ocean Waves on Airborne Lidar Imaging; Applied Optics; Jun. 20, 1996; pp. 3261-3269; vol. 35, No. 18.

Elite Scuba Squad Search Ships for Drugs and Terrorist Bombs; http://latino.foxnews.com/latino/news/2011/02128/miami-elite-divers-target-drug-smuggler-ships/#content; Feb. 28, 2011; 2 pages.

* cited by examiner

LASER SURVEILLANCE SYSTEM

BACKGROUND

The present disclosure relates generally to surveillance systems and, more particularly, to methods and systems for use in inspecting marine vessels.

The number of vehicles, such as marine vessels, aircraft, and land vehicles, entering various ports exceeds several tens of millions annually. For example, in any major port, hundreds of utility boats, sailboats, and pleasure craft go unmonitored. It is possible that marine vessels may be used to conceal and/or smuggle unlawful goods across borders. Moreover, at least some known marine vessels, for example, may include at least one "parasitic" device positioned below the waterline for use in transporting unlawful goods.

One known method for inspecting incoming vehicles includes sonar inspection. Using sonar enables vehicles to be inspected quickly, but does not provide the resolution necessary to discern low profile parasitic devices. Moreover, sonar may also be impacted by environmental effects, such as reverberation, that occur while the sonar sweep is conducted. As such, a team of divers are typically used to visually inspect for parasitic devices. However, the port water beneath a marine vessel may be murky, have unpredictable currents, and may even be inhabited with marine wildlife, such as sharks, barracuda, and/or eels. As such, visually inspecting a vehicle with divers may be dangerous, tedious, and/or time-consuming.

Because of the large number of marine vessels and/or the limited number of divers, at least some known ports select only a fraction of the incoming vehicles for inspection. For example, a marine vessel may be targeted because it was previously in a flagged country. As such, at some ports, security monitoring may be sporadic and/or incomplete.

BRIEF DESCRIPTION

In one aspect, a method is provided for inspecting a vessel. The method includes positioning a laser and detector mechanism generally at or below a water line. The laser and detector mechanism includes a laser source and a sensor. A laser is projected from the laser source towards the vessel being inspected. A reflection of the laser beam is received at the sensor.

In another aspect, a laser and detector mechanism is provided for use in inspecting a vessel. The mechanism includes a laser source and a sensor. The laser source is configured to project a laser beam towards the vessel being inspected. The laser source is positioned generally at or below a water line. The sensor is configured to receive a reflection of the laser beam. The sensor is positioned generally at or below the water line.

In yet another aspect, a system is provided for use in inspecting a vessel. The system includes a housing, a laser source positioned within the housing, and a sensor positioned within the housing. The housing is positioned generally at or below a water line. The laser source is configured to project a laser beam towards the vessel being inspected. The sensor is configured to receive a reflection of the laser beam.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, such illustrations are for convenience only. Any feature of a drawing may be referenced and/or claimed in combination with any feature of any other drawing.

DETAILED DESCRIPTION

The subject matter described herein relates generally to surveillance systems and, more particularly, to methods and systems for use in inspecting marine vessels. In one embodiment, an advanced harbor laser surveillance system is provided that includes a housing positioned generally at or below a water line, and a laser and detector mechanism positioned within the housing. In such an embodiment, the laser and detector mechanism includes a laser source and a sensor. The laser source projects a laser beam towards a vessel being inspected, and the sensor receives a reflection of the laser beam. The laser surveillance system enables a large quantity of vessels to be inspected for "parasitic" devices including towed "parasitic" devices.

While the following description references a marine vessel, it should be appreciated that the subject matter described herein may be applicable to any vehicle that may be used to transport goods. Accordingly, any reference to "vessel" throughout the following description is merely meant to illustrate one potential application of the teachings of the subject matter described herein.

As used herein, the term "water line" may refer to a line marking a level reached by a level of water. For example, a water line may indicate a location on a hull of a marine vessel to which water rises. Moreover, as used herein, the term "parasitic" device may refer to an object coupled to an exterior surface of a hull of a marine vessel. For example, a parasitic device may be coupled to an exterior surface of a hull below the water line to conceal and/or smuggle contraband. Other examples may include towed devices.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
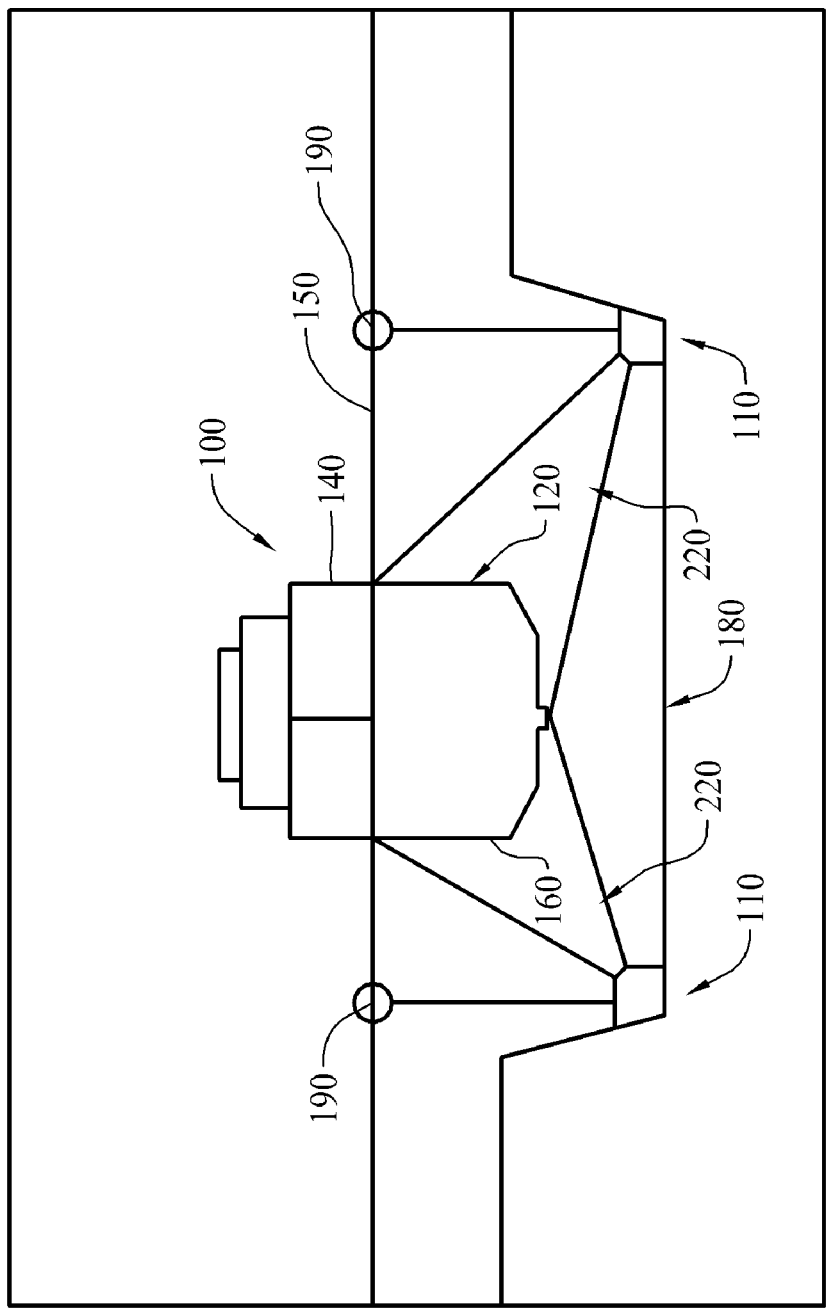
FIG. 1 is a schematic illustration of an exemplary vessel that may be inspected by a laser and detector mechanism (LDM)
Figure 3:
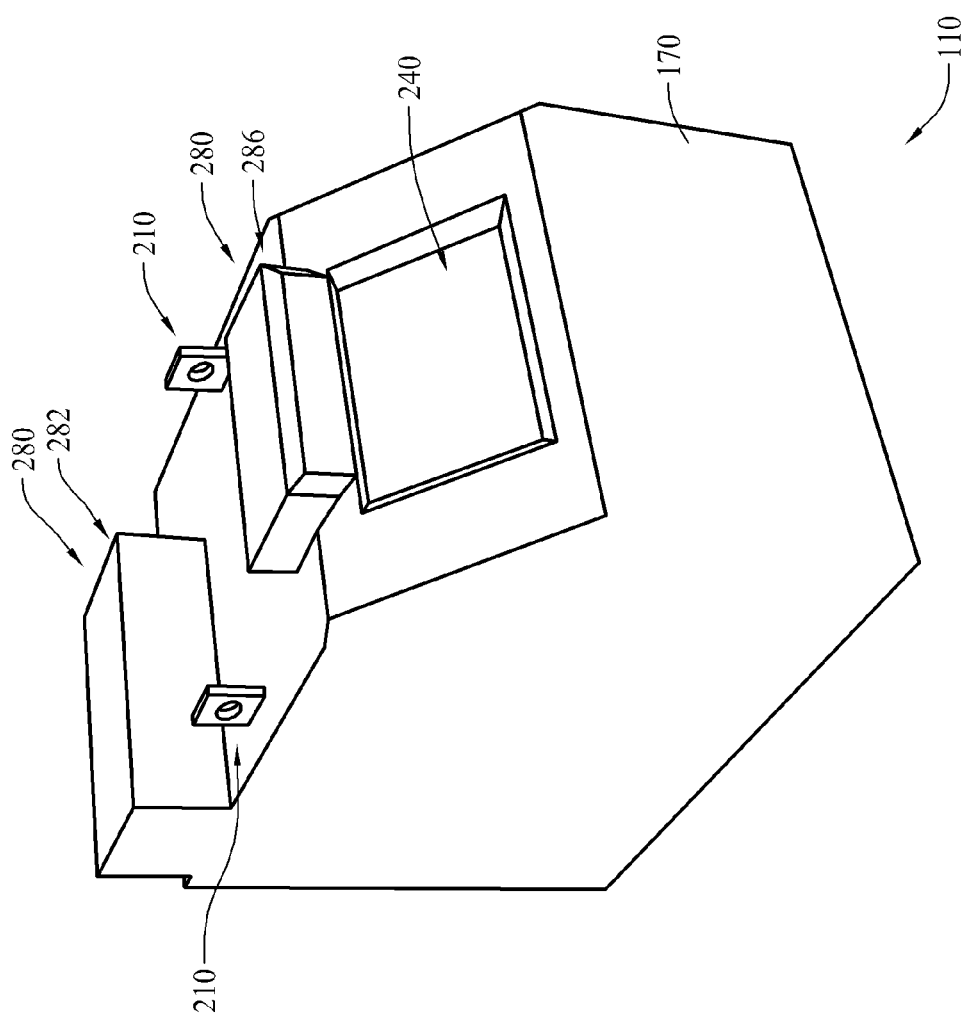
FIG. 3 is a perspective view of the LDM shown in FIG. 1.
Figure 4:
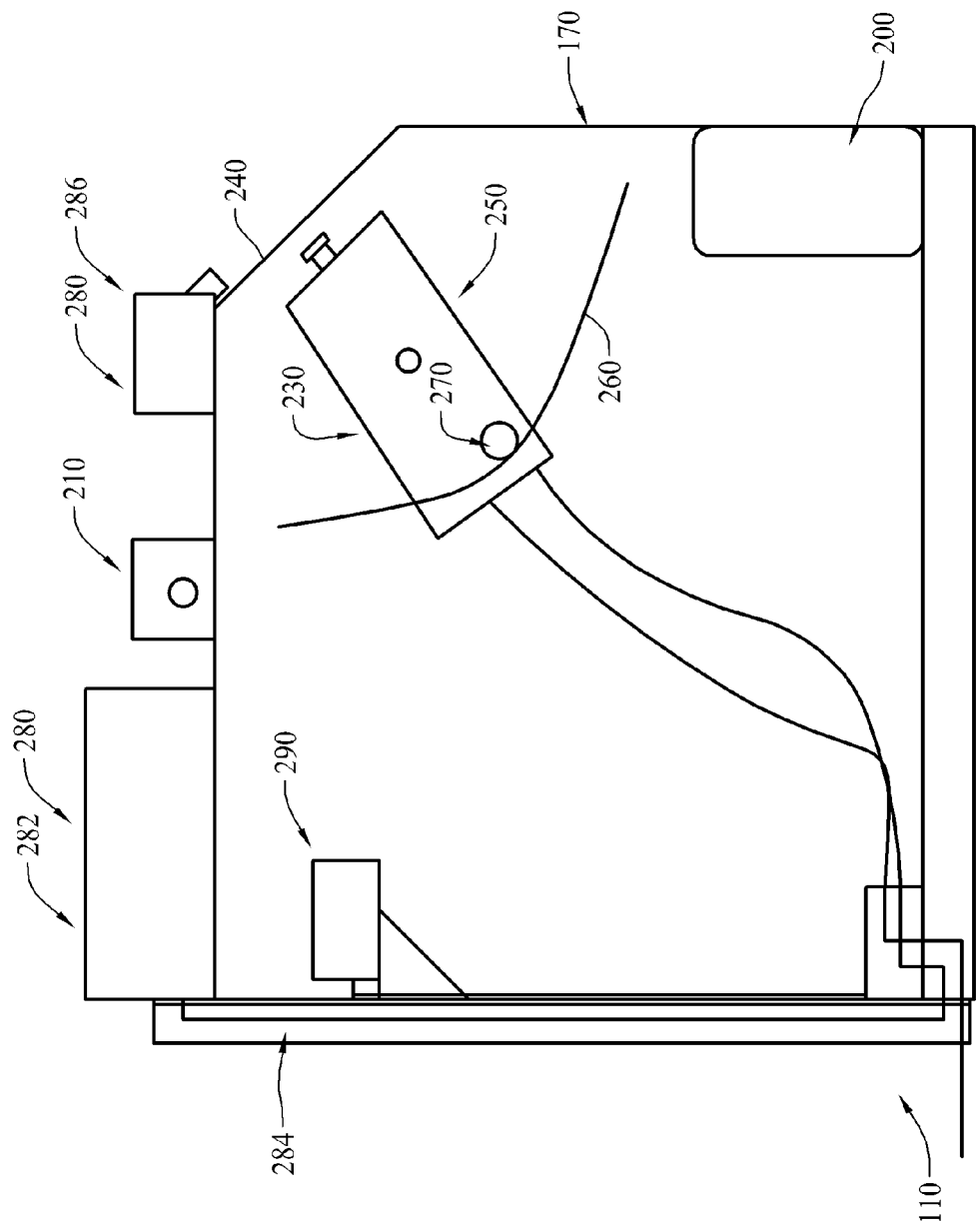
FIG. 4 is a schematic illustration of the LDM shown in FIG. 1.

FIG. 1 is a schematic illustration of an exemplary vessel 100 that may be inspected using an exemplary laser and detector mechanism (LDM) 110. FIG. 3 is a perspective view of an exemplary LDM 110, and FIG. 4 is a schematic illustration of LDM 110. More specifically, in the exemplary embodiment, vessel 100 includes a hull 120. In the exemplary embodiment, hull 120 includes a first portion 140 extending generally above a water line 150 and a second portion 160 extending generally below water line 150.

Figure 2:
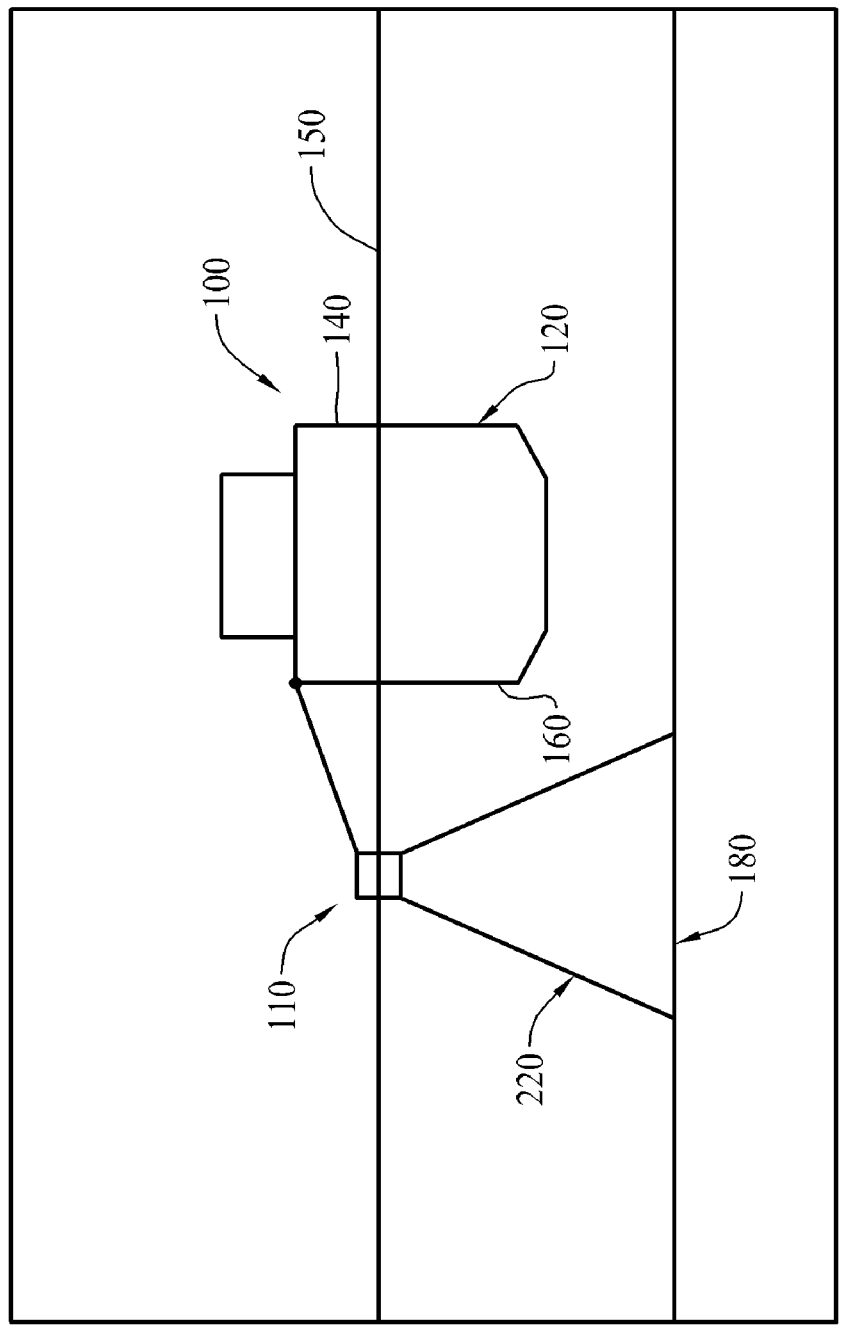
FIG. 2 is a schematic illustration of another exemplary vessel that may use an LDM to inspect a sea floor.

In the exemplary embodiment, LDM 110 is positioned within a housing 170 that is generally below water line 150. As such, in the exemplary embodiment, housing 170 (shown in FIG. 3) is fabricated from a non-corroding material and/or a corrosion-resistant material such as, without limitation, aluminum, stainless steal, titanium, and/or silicon. For example, in the exemplary embodiment, housing 170 is positioned on a ship channel floor 180. In one embodiment, housing 170 is positioned in a stanchion and/or revetment that facilitates shielding LDM 110 from a collision with hull 120 and/or any other object. Moreover, to facilitate identifying a location of LDM 110 at or above water line 150, a buoy 190 is positioned generally at water line 150 and above housing 170. Additionally or alternatively, as shown in FIG. 2, LDM 110 may be positioned generally at water line 150. In such an embodiment, housing 170 may be selectively moved by another vessel 100 to inspect a ship channel, an underwater pipeline, a base of a dyke, and/or a sea floor, for example. As such, LDM 110 may be selectively oriented to inspect upwards from below water line 150 and/or downwards from water line 150.

Housing 170 facilitates preventing undesired water from contacting LDM 110. In the exemplary embodiment, housing 170 is substantially watertight. Moreover, as shown in FIG. 4, an air flask 200 is positioned within housing 170 to enable a positive pressure to be maintained within housing 170 such that undesired water does not enter housing 170. For example, in one embodiment, air flask 200 is coupled to a barometer to regulate an air pressure within housing 170. Alternatively, housing 170 may include any other suitable mechanism that enables housing 170 to function as described herein.

In the exemplary embodiment, housing 170 includes a coupling mechanism 210 that enables housing 170 to be selectively moved from ship channel floor 180. For example, in the exemplary embodiment, coupling mechanism 210 is a lifting ring that is sized to receive a metal loop or hook (not shown) therethrough. As such, housing 170 may be removed from the stanchion and/or revetment for maintenance and/or repair performed above water line 150. Alternatively, coupling mechanism 210 may be any other suitable mechanism that enables coupling mechanism 210 to function as described herein.

In the exemplary embodiment, LDM 110 is oriented to transmit or project at least one laser beam 220 towards vessel 100 or, more specifically, towards hull second portion 160. More specifically, as shown in FIG. 4, LDM 110 includes a laser source 230 that projects laser beam 220 through an enclosure window 240 towards vessel 100 and a sensor 250 that receives a reflection (not shown) of laser beam 220. In the exemplary embodiment, laser source 230 and sensor 250 are positioned within a common housing. Alternatively, laser source 230 may be positioned remote from sensor 250. In the exemplary embodiment, LDM 110 is positioned on a rail 260 that enables LDM 110 to be selectively oriented at a desired angle. More specifically, LDM 110 includes a trunion 270 that moves along rail 260 such that an orientation of LDM 110 may be selectively raised and/or lowered.

In one embodiment, laser source 230 projects a laser having a wavelength of between approximately 308 nanometers (nm) and 1350 nm. More particularly, the laser may have a wavelength of between approximately 512 nanometers (nm) and 1024 nm. In such an embodiment, the laser may be visible to the naked eye. Alternatively, laser source 230 may project a laser having any suitable wavelength that enables LDM 110 to function as described herein.

In the exemplary embodiment, housing 170 includes at least one fluid moving mechanism 280 that is oriented to channel fluid through housing 170 and/or about an exterior surface of housing 170. For example, in the exemplary embodiment, a first fluid moving mechanism 282 is a heat exchanger that facilitates cooling LDM 110. More specifically, in the exemplary embodiment, first fluid moving mechanism 282 channels fluid through a line 284 extending through housing 170. Moreover, in the exemplary embodiment, a second fluid moving mechanism 286 is a pump and/or water jet that facilitates maintaining enclosure window 240 generally free of debris and/or growth thereon. In the exemplary embodiment, second fluid moving mechanism 286 channels fluid across an exterior surface of housing 170 or, more specifically, across enclosure window 240.

In the exemplary embodiment, a control box 290, described in more detail below, is positioned within housing 170. In the exemplary embodiment, control box 290 is communicatively coupled to LDM 110 and/or to a remote computing device (not shown) to enable communication signals to be transmitted therebetween.

Figure 5:
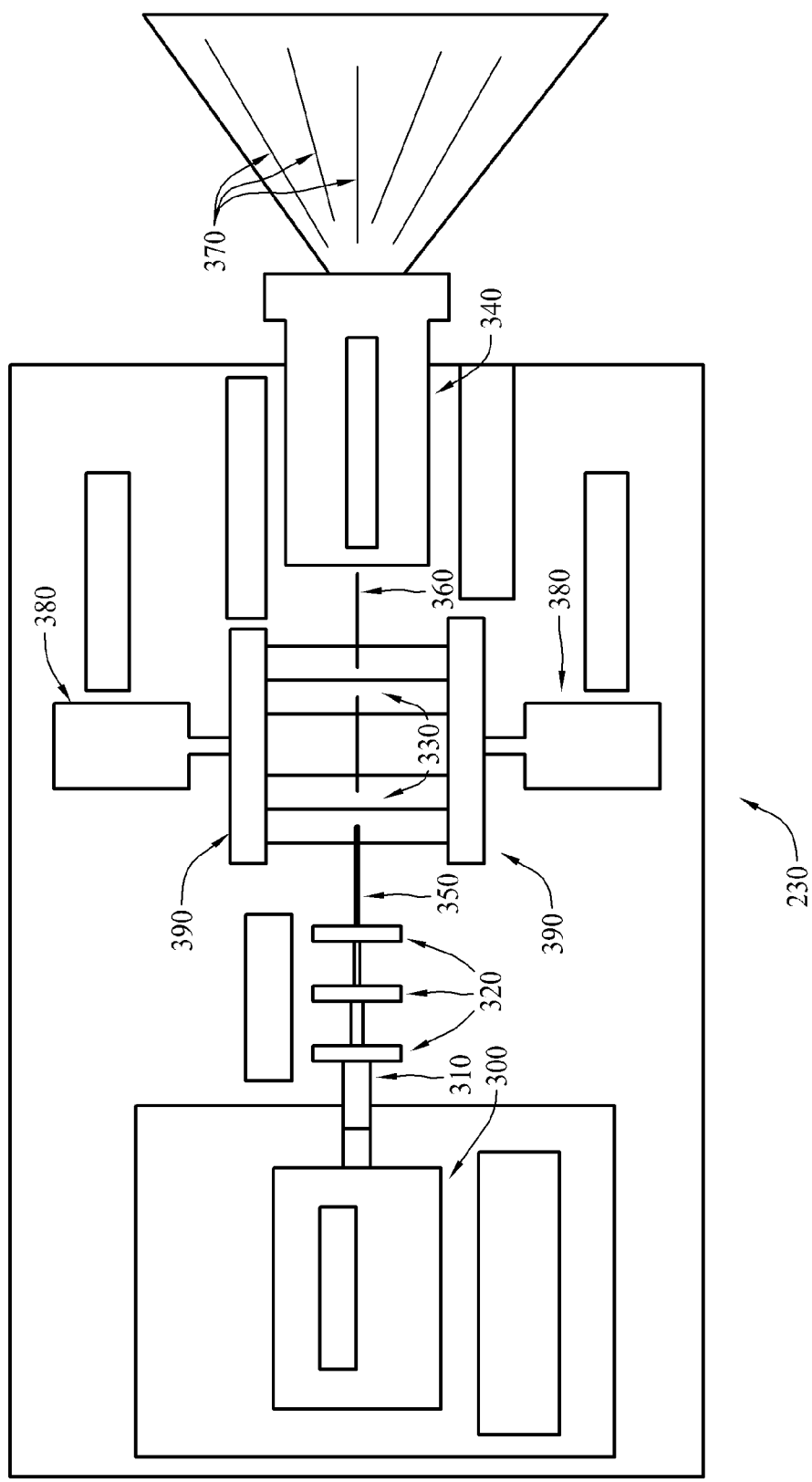
FIG. 5 is a schematic illustration of a laser source that may be used with the LDM shown in FIG. 1.

FIG. 5 is a schematic illustration of laser source 230. In the exemplary embodiment, laser source 230 includes a laser pump 300 that emits or projects a first laser beam 310 through at least one optic lens, such as a lens 320, a prism 330, and/or a diffuser 340. In the exemplary embodiment, an array of lenses 320 are positioned to transmit and/or to refract first laser beam 310 to produce a second laser beam 350. In the exemplary embodiment, an array of prisms 330 are positioned to transmit, refract, reflect, and/or split second laser beam 350 to produce a third laser beam 360. Moreover, in the exemplary embodiment, diffuser 340 is positioned to transmit, diffuse, and/or scatter third laser beam 360 into a plurality of sub beams 370. That is, a position and/or an orientation of at least one of the optical devices (i.e., lenses 320, prisms 330, and/or diffuser 340) may be adjusted and/or rotated via an associated motor or gear reduction mechanism to facilitate adjusting a frequency and/or wavelength of the laser beam based on a desired range and/or detected water conditions adjacent LDM 110.

In the exemplary embodiment, a prism control motor 380 and a prism control gearbox 390 are coupled to the array of prisms 330 to enable third laser beam 360 to be selectively adjusted. For example, in one embodiment, prisms 330 may be adjusted to transmit and/or to project a laser beam having a desired wavelength and/or a polarization based on at least an amount of debris and/or growth on enclosure window 240, a turbidity of water between LDM 110 and vessel 100, a local weather condition, and/or a surface of hull second portion 160. The turbidity of water may be determined using a suitable turbidity mechanism (not shown). Additionally or alternatively, a power output associated with laser source 230 or, more particularly, laser source 230 and/or a sensitivity associated with sensor 250 may be selectively adjusted. Any suitable factor that enables LDM 110 to function as described herein may be considered to adjust any suitable mechanism.

In the exemplary embodiment, control box 290 includes a computing device 400 that is programmed to control an operation of LDM 110, air flask 200, and/or fluid moving mechanism 280. Moreover, in the exemplary embodiment, control box 290 or, more particularly, computing device 400 receives a signal (not shown) from LDM 110 or, more particularly, sensor 250, and converts the signal to a digital image (not shown) of vessel 100.

Figure 6:
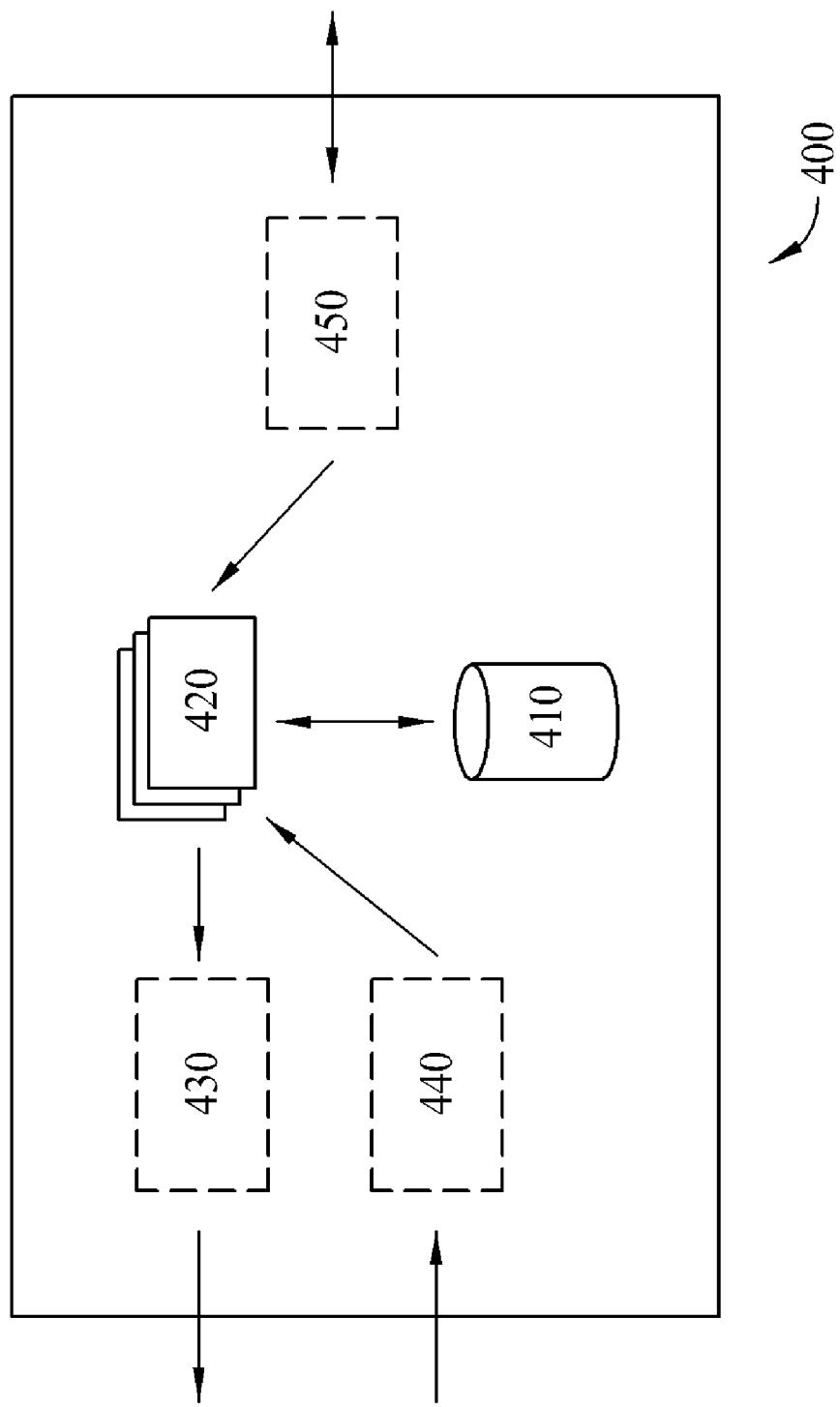
FIG. 6 is a block diagram of an exemplary computing device that may be used with the LDM shown in FIG. 1.

FIG. 6 is block diagram of computing device 400. In the exemplary embodiment, computing device 400 includes a memory device 410 and a processor 420 coupled to memory device 410 for executing programmed instructions. Processor 420 may include one or more processing units (e.g., in a multi-core configuration). In one embodiment, executable instructions and/or structural health data are stored in memory device 410. For example, in the exemplary embodiment, memory device 410 stores software for use in controlling an operation of LDM 110, air flask 200, and/or fluid moving mechanism 280 and/or for use in converting a signal to a digital image. Computing device 400 is programmable to perform one or more operations described herein by programming memory device 410 and/or processor 420. For example, processor 420 may be programmed by encoding an operation as one or more executable instructions and providing the executable instructions in memory device 410.

Processor 420 may include, but is not limited to, a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

Memory device 410, as described herein, is one or more devices that enable information such as executable instructions and/or other data to be stored and retrieved. Memory device 410 may include one or more computer readable media, such as, without limitation, dynamic random access memory (DRAM), static random access memory (SRAM), a solid state disk, and/or a hard disk. Memory device 410 may be configured to store, without limitation, executable instructions, structural health data, and/or any other type of data suitable for use with the methods and systems described herein.

In the exemplary embodiment, computing device 400 includes a presentation interface 430 that is coupled to processor 420. Presentation interface 430 outputs and/or displays information, such as, but not limited to, configuration data, management data, and/or any other type of data to a user (not shown). For example, presentation interface 430 may include a display adapter (not shown) that is coupled to a display device (not shown), such as a cathode ray tube (CRT), a liquid crystal display (LCD), a light-emitting diode (LED) display, an organic LED (OLED) display, and/or an "electronic ink" display.

In the exemplary embodiment, computing device 400 includes an input interface 440 that receives input from a user. For example, input interface 440 may be configured to receive an instruction for controlling an operation of LDM 110, air flask 200, and/or fluid moving mechanism 280 and/or any other type of data suitable for use with the methods and systems described herein. In the exemplary embodiment, input interface 440 is coupled to processor 420 and may include, for example, a keyboard, a pointing device, a mouse, a stylus, a touch sensitive panel (e.g., a touch pad or a touch screen), a gyroscope, an accelerometer, a position detector, and/or an audio input interface. A single component, such as a touch screen, may function as both a display device of presentation interface 430 and as input interface 440.

In the exemplary embodiment, computing device 400 includes a communication interface 450 coupled to memory device 410 and/or processor 420. Communication interface 450 is coupled in communication with a remote device, such as LDM 110, air flask 200, fluid moving mechanism 280, and/or another computing device 400. For example, communication interface 450 may include, without limitation, a wired network adapter, a wireless network adapter, and/or a mobile telecommunications adapter.

Figure 7:
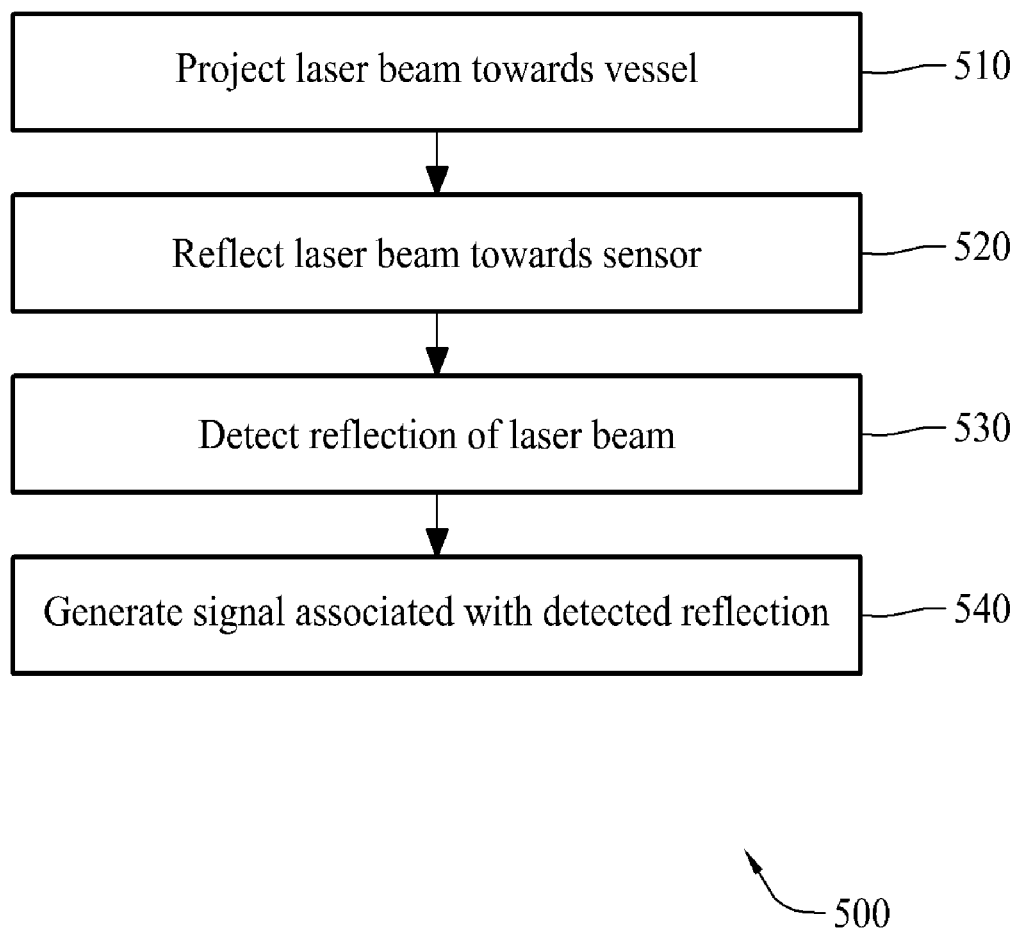
FIG. 7 is a flow chart illustrating an exemplary method that may be used in inspecting a vessel using the LDM shown in FIG. 1.

FIG. 7 is a flow chart illustrating an exemplary method 500 that may be used to inspect vessel 100 using LDM 110. During operation, in the exemplary embodiment, LDM 110 transmits or projects 510 laser beam 220 towards vessel 100. In the exemplary embodiment, a power output associated with LDM 110 or, more particularly, laser source 230 is adjusted based on at least a turbidity of water. Additionally or alternatively, laser beam 220 may be transmitted through lens 320, prism 330, and/or diffuser 340 such that first laser beam 310, second laser beam 350, third laser beam 360, and/or sub-beams 370 may be projected 510 onto hull 120.

In the exemplary embodiment, laser beam 220 is projected 510 along a longitudinal length of hull 120 such that second portion 160 of hull 120 may be inspected for parasitic devices. For example, in the exemplary embodiment, laser source 230 projects 510 laser beam 220 onto hull 120 as vessel 100 passes by LDM 110. More specifically, in the exemplary embodiment, LDM 110 is generally stationary such that laser beam 220 is generally stationary relative to vessel 100 as vessel 100 moves through a laser beam field of view. Additionally or alternatively, LDM 110 may be actuatable and/or rotatable about a vertical axis such that laser beam 220 is projected 510 onto hull 120 as vessel 100 is generally stationary relative to LDM 110.

In the exemplary embodiment, hull 120 reflects 520 at least a portion of laser beam 220 towards sensor 250. In the exemplary embodiment, sensor 250 detects or receives 530 a signal or, more particularly, the reflection of laser beam 220. More specifically, in the exemplary embodiment, sensor 250 receives 530 the refection of laser beam 220 from second portion 160 of hull 120. In the exemplary embodiment, a sensitivity associated with sensor 250 is adjusted based on at least the turbidity of water. Additionally or alternatively, a screen and/or blocking mechanism (not shown) may be used to filter at least a portion of the refection of laser beam 220 from second portion 160 of hull 120.

In the exemplary embodiment, a signal associated with the received reflection is generated 540, and the signal is converted into a digital image for use in inspecting vessel 100. In the exemplary embodiment, the signal and/or the digital image is transmitted to computing device 400, and computing device 400 identifies whether a parasitic device is coupled to hull 120. As such, in the exemplary embodiment, computing device 400 facilitates inspecting vessel 100 based on at least a reflection of laser beam 220. In one embodiment, computing device 400 may determine whether a visual inspection is necessary to more fully ascertain whether a parasitic device is coupled to hull 120. In such an embodiment, computing device 400 provides an indication to at least one diver for use in instructing the diver to conduct a visual inspection.

In the exemplary embodiment, computing device 400 is programmed to identify and/or compare a signature (i.e., a physical feature of vessel 110 that may be used to identify vessel 100) to a predetermined signature and/or a previously identified signature of vessel 100. In at least some embodiments, the signature may be automatically updated and/or stored within memory device 410 for use in a subsequent inspection.

The above-described systems and methods enable a marine vessel to be inspected to determine whether it is being used to smuggle a good, for example. More specifically, the embodiments described herein enable a reliable and/or accurate image of underwater objects to be generated with a generally high-resolution quality. As such, the embodiments described herein facilitate automatically screening the marine vessel to determine whether it should be selected for visual inspection. The embodiments described herein enable personnel and/or other resources used to inspect marine vessels to be allocated strategically and/or efficiently. Accordingly, the embodiments described herein facilitate increasing safety and/or reducing costs associated with inspecting marine vessels.

The exemplary systems and methods are not limited to the specific embodiments described herein, but rather, components of each system and/or steps of each method may be utilized independently and separately from other components and/or method steps described herein. Each component and each method step may also be used in combination with other components and/or method steps.

This written description uses examples to disclose certain embodiments of the invention, including the best mode, and also to enable any person skilled in the art to practice those certain embodiments, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of inspecting a vessel, said method comprising:
    positioning a laser and detector mechanism at least one of generally at or below a water line, wherein the laser and detector mechanism includes a laser source and a sensor;
    projecting, from the laser source, a laser beam towards the vessel being inspected;
    receiving, at the sensor, a reflection of the laser beam being projected; and
    identifying, from a signature of the vessel generated by the reflected laser beam, the presence of a parasitic device coupled to a hull of the vessel.

2. A method in accordance with claim 1 further comprising channeling fluid through a housing positioned around the laser source and the sensor.

3. A method in accordance with claim 1 further comprising channeling fluid about at least an exterior surface of a housing positioned around the laser source and the sensor.

4. A method in accordance with claim 1, wherein projecting a laser further comprises:
    splitting the laser beam into a plurality of sub-beams; and
    projecting the plurality of sub-beams towards the vessel being inspected.

5. A method in accordance with claim 1 further comprising:
    determining a turbidity of water adjacent to at least one of the vessel and the laser and detector mechanism; and
    adjusting a power output associated with the laser source based on at least the turbidity of the water.

6. A method in accordance with claim 1 further comprising:
    determining a turbidity of the water adjacent to at least one of the vessel and the laser and detector mechanism; and
    adjusting at least one of a sensitivity associated with the sensor and a position of an optical device based on at least the turbidity of water.

7. A method in accordance with claim 1, wherein identifying further comprises:
    generating a signal associated with the received reflected laser beam; and
    converting the signal to a digital image.

8. A laser and detector mechanism for use in inspecting a vessel, said mechanism comprising:
    a laser source configured to project a laser beam towards the vessel being inspected, said laser source positioned at least one of generally at or below a water line;
    a sensor configured to receive a reflection of the laser beam projected towards the vessel being inspected, said sensor positioned at least one of generally at and below the water line; and
    a computing device coupled in communication with said sensor, said computing device configured to identify the presence of a parasitic device coupled to a hull of the vessel based on a signature of the vessel generated by the reflected laser beam.

9. A mechanism in accordance with claim 8, wherein said laser source comprises an optic lens configured to split the laser beam projected from said laser source.

10. A mechanism in accordance with claim 8 further comprising a turbidity mechanism configured to determine a turbidity of water adjacent to at least one of the vessel and said laser and detector mechanism and adjust a power output associated with said laser source based on at least the turbidity of water.

11. A mechanism in accordance with claim 8 further comprising a turbidity mechanism configured to determine a turbidity of water adjacent to at least one of the vessel and said laser and detector mechanism and adjust at least one of a sensitivity associated with said sensor and a position of an optical device based on at least the turbidity of water.

12. A mechanism in accordance with claim 8, wherein said computing device is programmed to receive a signal from said sensor and convert the signal to a digital image.

13. A system for use in inspecting a vessel, said system comprising:
    a housing positioned at least one of generally at or below a water line;
    a laser source positioned within said housing, said laser source configured to project a laser beam towards the vessel being inspected;
    a sensor positioned within said housing, said sensor configured to receive a reflection of the laser beam projected towards the vessel being inspected; and
    a computing mechanism coupled in communication with said sensor, said computing mechanism configured to identify the presence of a parasitic device coupled to a hull of the vessel based on a signature of the vessel generated by the reflected laser beam.

14. A system in accordance with claim 13 further comprising a buoy coupled to said housing, said buoy positioned generally at the water line.

15. A system in accordance with claim 13 further comprising a fluid moving mechanism oriented to channel fluid through said housing.

16. A system in accordance with claim 13 further comprising a fluid moving mechanism oriented to channel fluid about at least an exterior surface of said housing.

17. A system in accordance with claim 13, wherein said laser source comprises an optic lens configured to split the laser beam projected from said laser source.

18. A system in accordance with claim 13 further comprising a turbidity mechanism configured to determine a turbidity of water adjacent to at least one of the vessel and said laser and detector mechanism and adjust a power output associated with said laser source based on at least the turbidity of water.

19. A system in accordance with claim 13 further comprising a turbidity mechanism configured to determine a turbidity of water adjacent to at least one of the vessel and said laser and detector mechanism and adjust at least one of a sensitivity associated with said sensor and a position of an optical device based on at least the turbidity of water.

20. A system in accordance with claim 13 wherein said computing mechanism is programmed to receive a signal from said sensor and convert the signal to a digital image.

* * * * *